United States Patent
Viswanathan et al.

(12)

(10) Patent No.: US 10,831,019 B2
(45) Date of Patent: Nov. 10, 2020

(54) ANGULAR VELOCITY CORRECTION OF A SCANNING LIGHT BEAM BY OPTICAL METHODS

(71) Applicant: Microvision, Inc., Redmond, WA (US)

(72) Inventors: P. Selvan Viswanathan, Bellevue, WA (US); Matthieu Saracco, Redmond, WA (US); Roger F. Johnson, Bellevue, WA (US); Ian Blanch, Seattle, WA (US)

(73) Assignee: Microvision, Inc., Redmond, WA (US)

( * ) Notice: Subject to any disclaimer, the term of this patent is extended or adjusted under 35 U.S.C. 154(b) by 347 days.

(21) Appl. No.: 16/042,898

(22) Filed: Jul. 23, 2018

(65) Prior Publication Data

US 2020/0026065 A1 Jan. 23, 2020

(51) Int. Cl.
*G02B 26/08* (2006.01)
*G02B 26/10* (2006.01)
*H04N 9/31* (2006.01)

(52) U.S. Cl.
CPC ....... *G02B 26/0833* (2013.01); *G02B 26/101* (2013.01); *H04N 9/3135* (2013.01); *H04N 9/3161* (2013.01)

(58) Field of Classification Search
CPC .............. G02B 26/0833; G02B 26/101; H04N 9/3135; H04N 9/3161; H04N 9/3182; H04N 9/3129
USPC ........................................................ 359/205.1
See application file for complete search history.

(56) References Cited

U.S. PATENT DOCUMENTS

| | | | |
|---|---|---|---|
| 2002/0018185 A1* | 2/2002 | Kuramochi | G02B 27/0172 353/69 |
| 2010/0118367 A1* | 5/2010 | Takizawa | G02B 26/105 359/206.1 |

* cited by examiner

*Primary Examiner* — Euncha P Cherry
(74) *Attorney, Agent, or Firm* — Kevin D. Wills

(57) ABSTRACT

An angular velocity correcting optical device receives a sinusoidally swept input light beam and outputs a non-sinusoidally swept output beam. The output beam may have a constant angular velocity. The output beam may have a constant pitch on a target surface for a constant periodicity pulsed light beam. Optical surfaces may be freeform surfaces specified by polynomials.

15 Claims, 12 Drawing Sheets

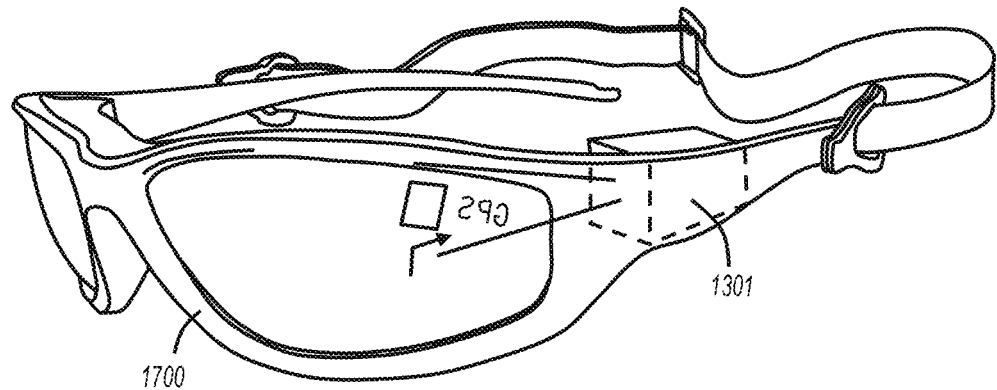
FIG. 19
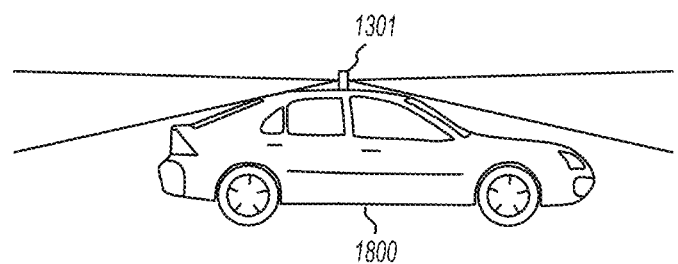
FIG. 20
FIG. 21
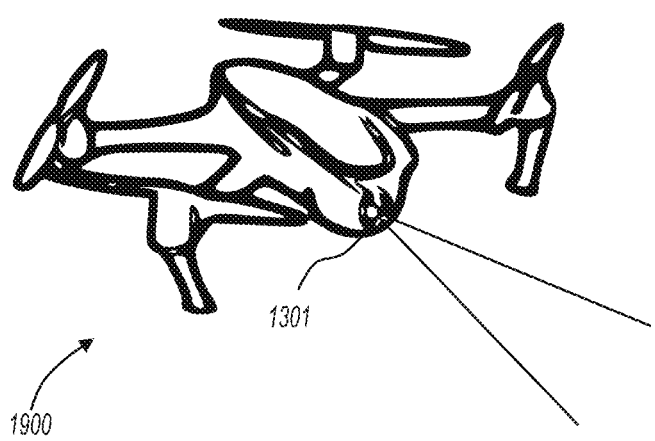

ANGULAR VELOCITY CORRECTION OF A SCANNING LIGHT BEAM BY OPTICAL METHODS

FIELD

The present invention relates generally to scanning laser beams, and more specifically to laser beams that scan sinusoidally.

BACKGROUND

Resonant scanning systems exhibit a velocity profile that is sinusoidal. For example, a resonant scanning mirror that reflects laser light pulses and sweeps them in a field of view will create a scanned beam that moves faster at the center of the sweep than at the edges of the sweep. When the light pulses are created with a uniform periodicity, the pulses are relatively sparse at the center of the sweep and relatively dense at the edges of the sweep.

BRIEF DESCRIPTION OF THE DRAWINGS

FIG. 19 shows eyewear in accordance with various embodiments of the present invention;

FIG. 20 shows an automobile in accordance with various embodiments of the present invention; and FIG. 21 shows a drone in accordance with various embodiments of the present invention.

DESCRIPTION OF EMBODIMENTS

Figure 1:
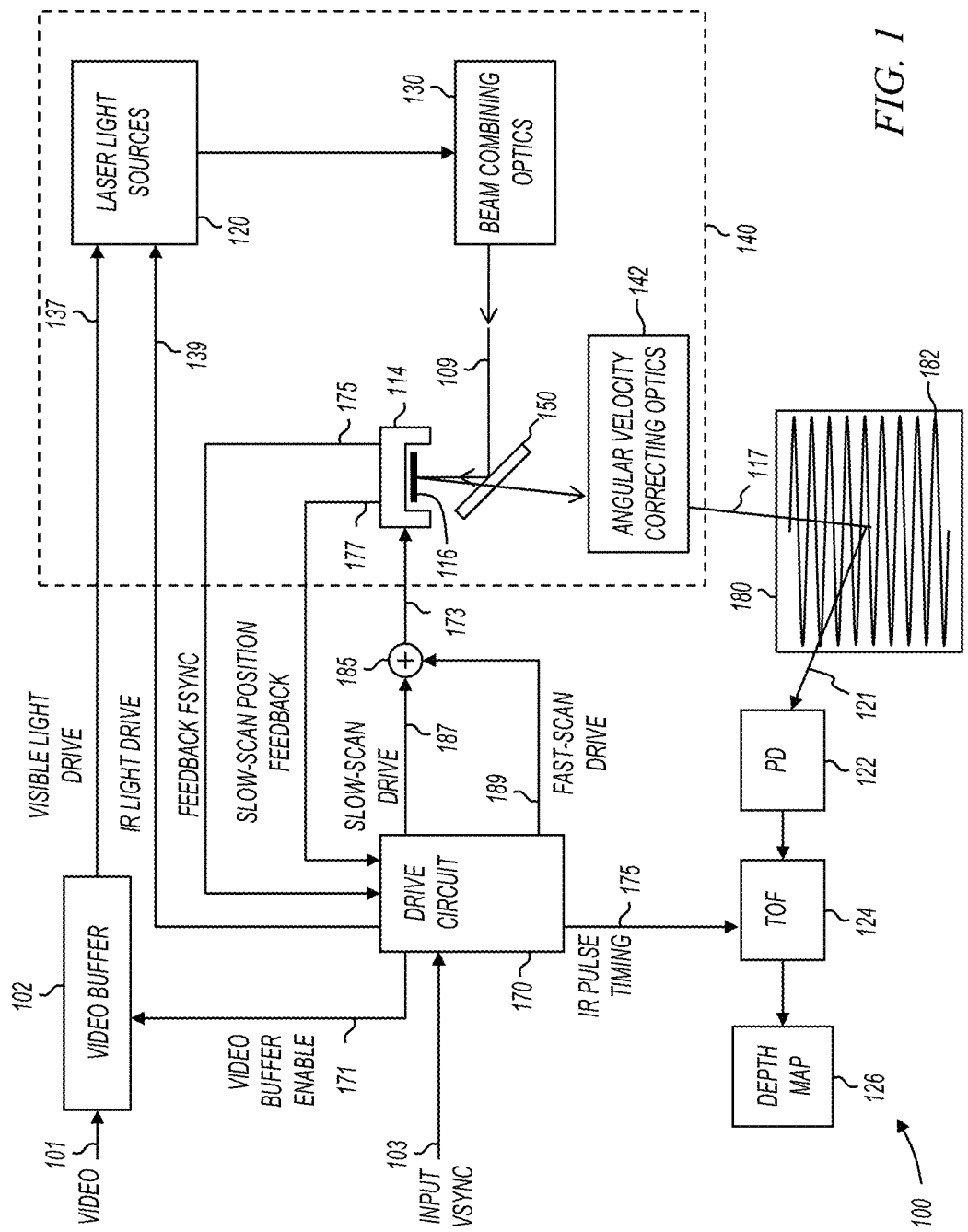
FIG. 1 shows a scanning laser projection system in accordance with various embodiments of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 shows a scanning laser projection system in accordance with various embodiments of the present invention. Scanning laser projection system 100 includes video buffer 102, scanning engine 140, drive circuit 170, summer 185, photodetector 122, time-of-flight (TOF) measurement circuit 124, and depth map storage device 126.

In operation, video buffer 102 stores one or more rows of video content at 101 and provides drive values on node 137 to scanning engine 140 starting when commanded by drive circuit 170 through the video buffer enable signal 171. The commanded drive values correspond to electrical currents for visible light sources within laser light sources 120 (e.g., red, green, and blue laser diodes) such that the output intensity from the lasers is consistent with the input video content. In some embodiments, this process occurs at output pixel rates in excess of 150 MHz.

In some embodiments, the video data arrives row by row. For example, the first video data received may correspond to an upper left pixel in an image. Succeeding video data represents the remainder of the pixels in the top row from left to right, and then further rows from top to bottom. When the bottom right of the image is reached, then a complete "frame" of video data has been supplied. The rate at which frames of video data are received is referred to herein as the "frame rate." In typical applications, an input vertical sync (VSYNC) signal 103 is received with the video data and is asserted once per frame. Accordingly, the input VSYNC is periodic at the frame rate.

Scanning engine 140 includes laser light sources 120, beam combining optics 130, fold mirror 150, scanning device 114, and angular velocity correcting optical device 142. In some embodiments, laser light sources 120 include at least two laser light sources that emit light of different wavelengths. For example, in some embodiments, laser light sources 120 include a first laser diode that emits red light and a second laser diode that emits green light. Also for example, in some embodiments, laser light sources 120 include a third laser diode that emits blue light. In still further embodiments, laser light sources 120 includes a fourth laser diode that emits infrared (IR) light. These and other embodiments are described further below. The terms "red," "green," and "blue" are used herein to refer to wavelengths that are perceived by a human eye as that particular color. For example, "red" refers to any wavelength of light that a human may perceive as the color red, "green" refers to any wavelength of light that a human may perceive as the color green, and "blue" refers to any wavelength of light that a human may perceive as the color blue.

In some embodiments, laser light sources 120 only include one laser light source that emits IR light. In these embodiments, the video circuits may be omitted, and laser scanning system 100 functions as a light detection and ranging (LIDAR) system that uses IR light for determining distances to various objects in the field of view. In still further embodiments, laser light sources 120 includes multiple IR laser light sources that project light pulses that are interleaved in space so as to increase the apparent resolution of any resulting point cloud depth map.

Beam combining optics 130 includes one or more optic devices that combine laser light received from laser light sources 120. This combined laser beam is reflected off fold mirror 150 and directed to scanning mirror 116 within scanning device 114.

In some embodiments, scanning mirror 116 is an ultra-high speed gimbal mounted two dimensional bi-axial laser scanning mirror. An example is described further with reference to FIG. 10. In some embodiments, this bi-axial scanning mirror is fabricated from silicon using MEMS processes. In some embodiments, as described below with reference to FIG. 11, two independent MEMS mirrors are employed in a combined optical system, each responsible for one of the scan axes. One axis of rotation is operated quasi-statically and creates a sawtooth raster trajectory. This axis is also referred to as the slow-scan axis. The second axis of rotation is orthogonal to the first and is operated on a resonant vibrational mode of the scanning mirror. In some embodiments, the MEMS device uses electromagnetic actuation, achieved using a miniature assembly containing the MEMS die and small subassemblies of permanent magnets and an electrical interface, although the various embodiments are not limited in this respect. For example, some embodiments employ electrostatic or piezoelectric actuation. Any type of mirror actuation may be employed without departing from the scope of the present invention. In some embodiments, the slow-scan axis corresponds to the vertical axis and the fast-scan axis corresponds to the horizontal axis, although this is not a limitation of the present invention. For example, a rotation of the projector may result in the fast-scan axis being the vertical axis and the slow-scan axis being the horizontal axis In some embodiments, raster scan 182 is formed by combining a sinusoidal component on the horizontal fast-scan axis and a sawtooth component on the vertical slow-scan axis. In these embodiments, output beam 117 sweeps sinusoidally on the horizontal (back and forth left-to-right) axis, and sweeps vertically (top-to-bottom) in a sawtooth pattern with the display blanked during flyback (bottom-to-top). FIG. 1 shows the sinusoidal pattern as the beam sweeps vertically top-to-bottom, but does not show the flyback from bottom-to-top. In other embodiments, the vertical sweep is controlled with a triangular wave such that there is no flyback. In still further embodiments, the vertical sweep is sinusoidal or a non-symmetric scanning pattern. The various embodiments of the invention are not limited by the waveforms used to control the vertical and horizontal sweep or the resulting raster pattern.

Figure 2:
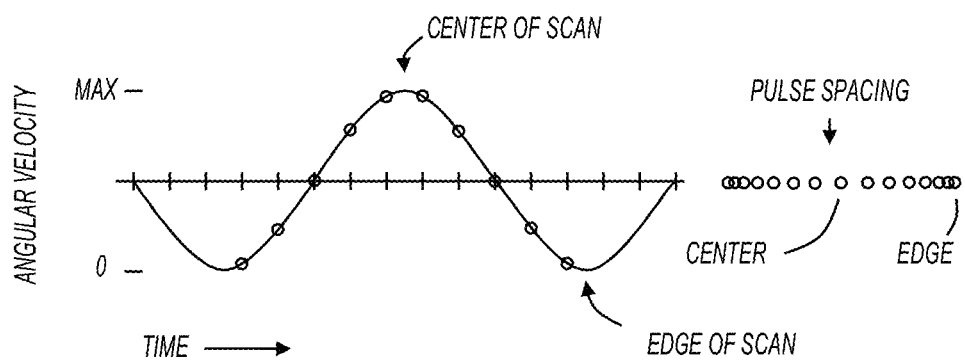
FIG. 2 shows spacing for constant period light pulses without angular velocity correction.

The resonant motion of the scanning mirror on the fast scan axis causes a non-uniform spacing of light pulses on the horizontal axis when pulses are created with a uniform periodicity. For example, light pulses are relatively sparse at the center of the horizontal sweep when the scanning mirror has the highest velocity, and clustering or bunching up of light pulses near the edges of the sweep when the scanner slows down. This is shown in FIG. 2 where pulses are spaced evenly in time as the angular velocity varies between the edge of the scan sweep and the center of the scan sweep.

Figure 3:
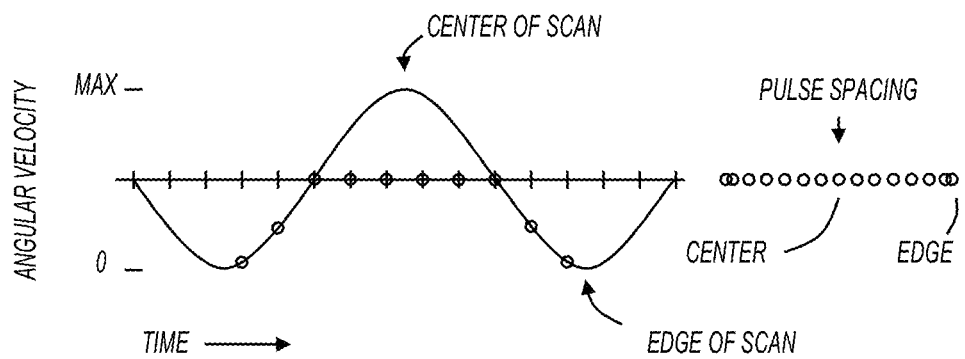
FIG. 3 shows spacing for constant period light pulses with angular velocity correction in accordance with various embodiments of the present invention.

Angular velocity correcting optical device 142 is an optical device that receives the sinusoidally swept beam from the scanning mirror and produces a substantially non-sinusoidally swept output beam. This is shown in FIG. 3 where pulses spaced evenly in time have substantially even angular spacing for at least a portion of the scan sweep. As used herein, the term "substantially non-sinusoidal" refers to an angular velocity profile that is not sinusoidal for at least a portion of the scan sweep.

In some embodiments, when fed with a sinusoidally swept input beam having light pulses of uniform periodicity, the output of angular velocity correction optical device 142 is a constant angularly spaced fan of light pulses for at least a portion of the sweep. In some embodiments, the input sinusoidal velocity profile is modified to a constant angular velocity within a sphere, and in other embodiments, the input sinusoidal velocity profile is modified to create constantly spaced pulses (constant pitch) on a planar or non-planar target surface. (this is what we term as the velocity correction lens i.e., it has virtually eliminated the 'bunching up' of pulses as the scanner slows down towards the edges).

In some embodiments, angular velocity correcting optical device 142 is an optical system that includes at least two curved optical surfaces, wherein the at least two curved optical surfaces are shaped to emit a substantially non-sinusoidally swept light ray when receiving a sinusoidally swept light ray from the scanning mirror. Further, in some embodiments, angular velocity correcting optical device 142 is also shaped to correct for projection distortion (e.g., keystoning, smile) caused by feeding the scanning mirror off axis. As used herein, the term "projection distortion" refers to distortion in any type of apparatus or system that projects light, including, but not limited to, image projectors and laser detection and ranging (LIDAR) systems.

Various embodiments of angular velocity correcting optical device 142 are described further below with reference to later figures. Velocity correcting optical devices may be reflective, refractive, or any combination thereof. Further, some velocity correcting optical devices have multiple free form optical surfaces that can be described mathematically with Zernike polynomials, Chebyshev polynomials, or the like.

A mirror drive circuit 170 provides a slow-scan drive signal on node 187 and a fast-scan drive signal on node 189. The fast-scan drive signal on node 189 includes an excitation signal to control the resonant angular motion of scanning mirror 116 on the fast-scan axis, and the slow-scan drive signal includes an excitation signal to cause deflection on the slow-scan axis. The slow-scan and fast-scan drive signals are combined by summer 185 to produce a drive signal used to drive MEMS device 114 on node 173. The resulting mirror deflection on both the fast and slow-scan axes causes output beam 117 to generate a raster scan 182 in field of view 180. In video projection operation, the laser light sources produce light pulses for each output pixel and scanning mirror 116 reflects the light pulses as beam 117 traverses the raster pattern. In LIDAR operation, the laser light sources produce light pulses for each point in the field of view to be measured, and scanning mirror 116 reflects the light pulses as beam 117 traverses the raster pattern.

Mirror drive circuit 170 receives a feedback sync signal (FSYNC) from scanning device 114 on node 175, and also receives a slow-scan position feedback signal on node 177. The feedback FSYNC signal on node 175 provides information regarding the position of scanning mirror 116 on the fast-scan axis as it oscillates at a resonant frequency. In some embodiments, the feedback FSYNC signal describes the instantaneous angular position of the mirror, and in other embodiments, the feedback signal describes the maximum deflection angle of the mirror, also referred to herein as the amplitude of the feedback signal. The slow-scan position feedback signal on node 177 provides information regarding the position of scanning mirror 116 on the slow-scan axis. In some embodiments, the slow-scan position feedback signal is used to phase lock movement on the slow-scan axis to the period of the input VSYNC signal received on node 103. In these embodiments, the frequency of movement on the slow-scan axis is dictated by a received sync signal (in this case, the input VSYNC).

In some embodiments, scanning device 114 includes one or more analog-to-digital converters to digitize sensed position information. In these embodiments, either or both of the feedback FSYNC signal and the slow-scan position feedback signal are digital representations of the mirror position on the two axes. In other embodiments, the feedback signals are analog signals, and drive circuit 170 includes one or more analog-to-digital converters to digitize the feedback signals as appropriate.

In some embodiments, drive circuit 170 provides drive signals on node 139 to drive an infrared (IR) light source. For example, drive circuit 170 may provide an electrical current to drive an IR laser diode. In these embodiments, an IR laser diode within laser light sources 120 may emit IR light pulses at different points along raster scan 182 within field of view of 180 to perform distance measurements. For example, scanning laser projection device 100 may include laser detection and ranging (LIDAR) capabilities, and drive circuit 170 may determine at what points within field of view 180 distance measurements are to be made.

Drive circuit 170 may be implemented in hardware, a programmable processor, or in any combination. For example, in some embodiments, drive circuit 170 is implemented in an application specific integrated circuit (ASIC). Further, in some embodiments, some of the faster data path control is performed in an ASIC and overall control is provided by a software programmable microprocessor. Examples of drive circuit implementations are described further below.

Photodetector (PD) 122 may be implemented using any suitable light detecting device. For example, in some embodiments PD 122 may be implemented by a PIN photodiode, a Silicon photomultiplier (SiPM), or an avalanche photodiode (APD). PD 122 detects IR light that is reflected from points within field of view 180. For example, when IR light pulses are scanned in the field of view and reflected off either a background surface or other objects in the field of view, PD 122 detects the reflections.

Time-of-flight (TOF) detection circuit 124 receives IR pulse timing information from drive circuit 170 and compares it to the timing of a received IR pulse to determine the TOF of an IR pulse, thereby measuring the distance to the either the projection surface or an object in the field of view. TOF detection circuit 124 may be implemented using any suitable circuit structures. For example, in some embodiments, TOF detection circuit 124 includes amplifiers, integrators, analog-to-digital converters, and the like.

Depth map storage 126 receives three dimensional (3D) data from TOF detection circuit 124 for various reflection points in the field of view and stores this data as a depth map. Depth map data stored in storage 126 may be used for any purpose. For example, in some embodiments, depth map data may be used for detecting an object in the field of view, gesture recognition, object recognition, or the like.

Depth map storage 126 may be implemented using any suitable circuit structure. For example, in some embodiments, depth map storage 126 is implemented in a dual port memory device that can be written on one port and read on a second port. In other embodiments, depth map storage 126 is implemented as data structures in a general purpose memory device. In still further embodiments, depth map storage 126 is implemented in an application specific integrated circuit (ASIC).

In some embodiments, multiple photodetectors and TOF measurement circuits are incorporated. For example, multiple IR laser light sources of different wavelengths may be used to interleave light pulses of different wavelengths along the raster pattern 182. These embodiments may include multiple photodetectors that are sensitive to different IR wavelengths, and multiple TOF measurement circuits to measure the times-of-flight of the IR laser light pulses.

Figure 4:
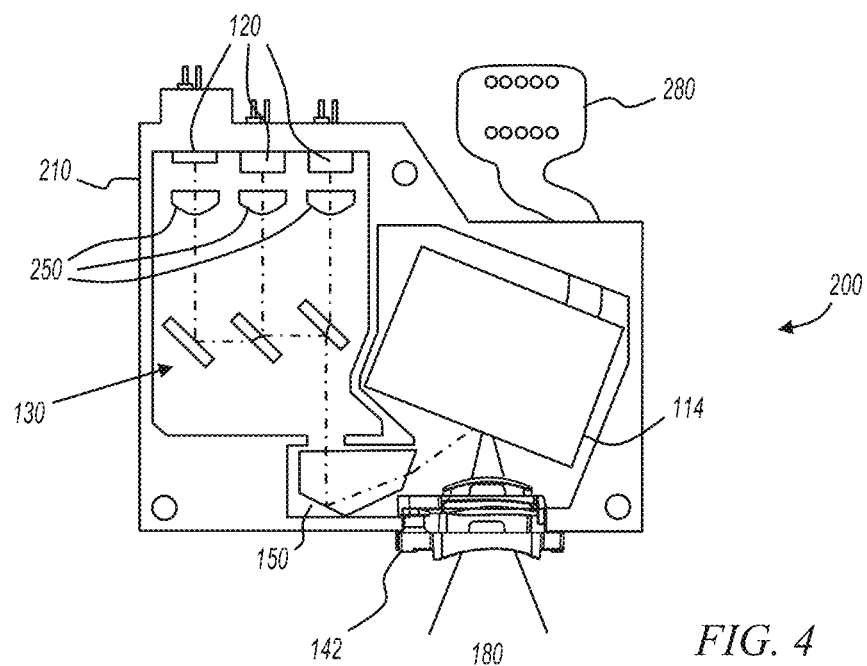
FIG. 4 shows a top view of a scanning engine with angular velocity correcting optics in accordance with various embodiments of the present invention.

FIG. 4 shows a top view of a scanning engine with angular velocity correcting optics in accordance with various embodiments of the present invention. Scanning engine 200 is an example embodiment of scanning engine 140 (FIG. 1). Scanning engine 200 includes carrier assembly 210, laser light sources 120, collimating lenses 250, combining optics 130, fold mirror 150, scanning device 114, angular velocity correcting optical device 142, and connector 280.

In some embodiments, laser light sources 120 emit visible light such as red, green, and blue light. In other embodiments, laser light sources 120 emit nonvisible light such as IR light. In still further embodiments, laser light sources 120 emit a combination of visible and nonvisible light. In operation, laser light sources 120 emit light that is collimated or focused by collimating lenses 250 and then combined by optics 130. Optics 130 may include mirrors, dichroic mirrors, polarization rotating devices, and polarizing beam splitters and/or combiners as appropriate depending on the number and wavelengths of light beams to be combined. Fold mirror 150 receives the combined output beam from optics 130 and provides it to scanning device 114. In some embodiments, scanning device 114 includes a single biaxial scanning mirror as shown in FIG. 1. In other embodiments, scanning device 114 includes two single axis mirrors. This is described further below with reference to later figures. Connector 280 is used to provide an electrical connection to scanning device 114.

Angular velocity correcting optical device 142 receives the scanned light beam from scanning device 114. Scanning device 114 can be considered a point source or virtual point source of light. Accordingly, angular velocity correcting optical device 142 is designed to refract light received from a point source or virtual point source. In some embodiments, the point source is located on the optical axis of optical device 142; however, this is not a limitation of the present invention.

In some embodiments, a photosensitive device such as PD 122 (FIG. 1) is included in scanning engine 200. In these embodiments, scanning engine 200 not only emits light, but also receives reflections of light.

Figure 5:
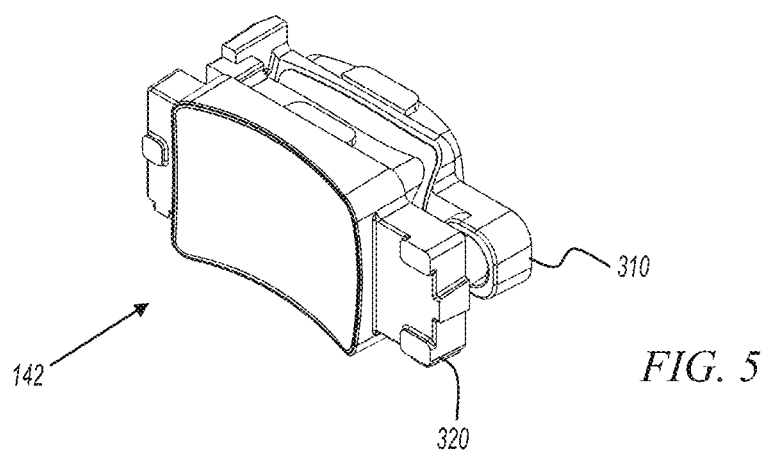
FIG. 5 shows a perspective view of an angular velocity correcting optical device in accordance with various embodiments of the present invention.

FIG. 5 shows a perspective view of an angular velocity correcting optical device in accordance with various embodiments of the present invention. Optical device 142 includes lens 310 and lens 320. Each of lenses 310 and 320 include two rotationally asymmetric free form surfaces. The design shown has refractive optical surfaces; however, some embodiments include reflective surfaces, and still other embodiments include a combination of reflective and refractive surfaces.

Figure 6:
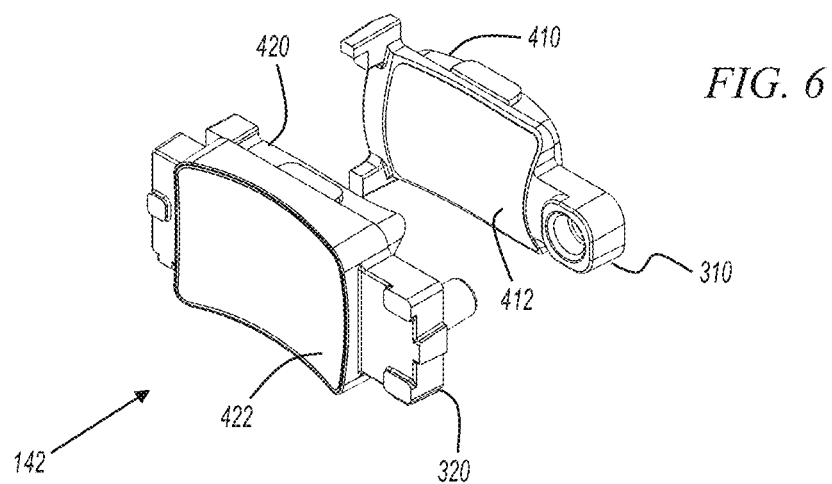
FIG. 6 shows an exploded view of the angular velocity correcting optical device of FIG. 5 in accordance with various embodiments of the present invention.

FIG. 6 shows an exploded view of the angular velocity correcting optical device of FIG. 5 in accordance with various embodiments of the present invention. Lens 310 is shown including two optical surfaces and lens 320 is also shown including two optical surfaces. Surfaces 410 and 412 form at least one first optical surface to refract light from a point source or virtual point source (the scanning mirror); and surfaces 420 and 422 form at least one second optical surface to refract light received from the at least one first optical surface, wherein the at least one first optical surface and the at least one second optical surface are shaped so that a light ray emerging from the at least one second optical surface sweeps substantially non-sinusoidally when a light ray from the point source sweeps sinusoidally.

In some embodiments, the at least one first optical surface and the at least one second optical surface are shaped so that a light ray emerging from the at least one second optical surface sweeps with a constant angular velocity when a light ray from the point source sweeps sinusoidally, and in other embodiments, the at least one first optical surface and the at least one second optical surface are shaped so that a light ray emerging from the at least one second optical surface sweeps with a constant pitch on a flat target surface when a light ray from the point source sweeps sinusoidally.

Lenses 310 and 320 may be designed according to, and described by, polynomials. The present invention is not limited by the type or number of polynomials that are used to describe lens or mirror surfaces.

In some embodiments, lenses 310 and 320 may be designed according to, and described by, Chebyshev polynomials. For example, using a finite sum of Chebyshev polynomial terms, the resulting sag equation may take the form:

$$z = \frac{c(x^2 + y^2)}{1 + \sqrt{1 - c^2(x^2 + y^2)}} + \sum_{i=0}^{N}\sum_{j=0}^{M} a_{ij} \cdot T_i(\bar{x}) \cdot T_j(\bar{y}) \quad (1)$$

where:
z is the sag of the surface parallel to the z-axis;
c is the vertex curvature;
$a_{ij}$ are the coefficients of the Chebyshev polynomial sum;
$\bar{x}, \bar{y}$ are normalized surface coordinates; and
N and M are the maximum polynomial orders in x and y dimensions.

The first ten Chebyshev polynomial coefficients are given by:

$T_0(x)=1$;

$T_1(x)=x$;

$T_2(x)=2x^2-1$;

$T_3(x)=4x^3-3x$;

$T_4(x)=8x^4-8x^2+1$;

$T_5(x)=16x^5-20x^3+5x$;

$T_6(x)=32x^6-48x^4+18x^2-1$;

$T_7(x)=64x^7-112x^5+56x^3-7x$;

$T_8(x)=128x^8-256x^6+160x^4-32x^2+1$;

$T_9(x)=256x^9-576x^7+432x^5-120x^3+9x$; and $T_{10}(x)=512x^{10}-1280x^8+1120x^6-400x^4+50x^2-1$.

In other embodiments, lenses 310 and 320 may designed according to, and described by, Zernike polynomials. For example, Zernike polynomial surface equations may take the form:

$$z = \frac{cr^2}{1 + \sqrt{1 - (1+k)c^2r^2}} + \sum_{j=1}^{66} C(j+1)ZP_j \quad (2)$$

where:
z is the sag of the surface parallel to the z-axis;
c is the vertex curvature;
k is the conic constant;
r is the radial distance=$\sqrt{x^2+y^2}$;
$ZP_j$ is the $j^{th}$ Zernike polynomial (range of j: 1 to 66);
$C_{(j+1)}$ is the coefficient for $ZP_j$; and

TABLE 1

| Zernike Coefficients | | |
|---|---|---|
| Coefficient | Alias | Definition |
| $C_1$ | K | Conic Constant |
| $C_2$ | $ZP_1$ | $1^{st}$ Zernike Coefficent |
| $C_3$ | $ZP_2$ | $2^{nd}$ Zernike Coefficent |
| $C_4$ | $ZP_3$ | $3^{rd}$ Zernike Coefficent |
| ... | | |
| $C_{(n+1)}$ | $ZP_n$ | $n^{th}$ Zernike Coefficent |
| ... | | |
| $C_{65}$ | $ZP_{64}$ | $64^{th}$ Zernike Coefficent |
| $C_{66}$ | $ZP_{65}$ | $65^{th}$ Zernike Coefficent |
| $C_{67}$ | $ZP_{66}$ | $66^{th}$ Zernike Coefficent |
| $C_{69}$ | Normalized Radius | Normalization Radius |

In still further embodiments, polynomials describing free form surfaces of lenses and/or mirrors may include extended polynomial terms and take the form:

$$z = \frac{cr^2}{1 + \sqrt{1 - (1+k)c^2r^2}} + \sum_{i=1}^{N} A_i E_i(x, y) \quad (3)$$

where:
z is the sag of the surface parallel to the z-axis;
c is the vertex curvature;
k is the conic constant;
r is the radial distance=$\sqrt{x^2+y^2}$;
N is the number of extended polynomial terms;
$A_i$ is the coefficient on the $i^{th}$ extended polynomial term; and $E_i$ is the $i^{th}$ extended polynomial term.

The polynomial terms E are a power series in x and y. The first term is x, then y, then $x^2$, xy, $y^2$, etc.

Various embodiments of the angular velocity correcting optical device employ different lens designs to achieve a substantially non-sinusoidally swept output beam for a sinusoidally swept input beam.

Figure 7:
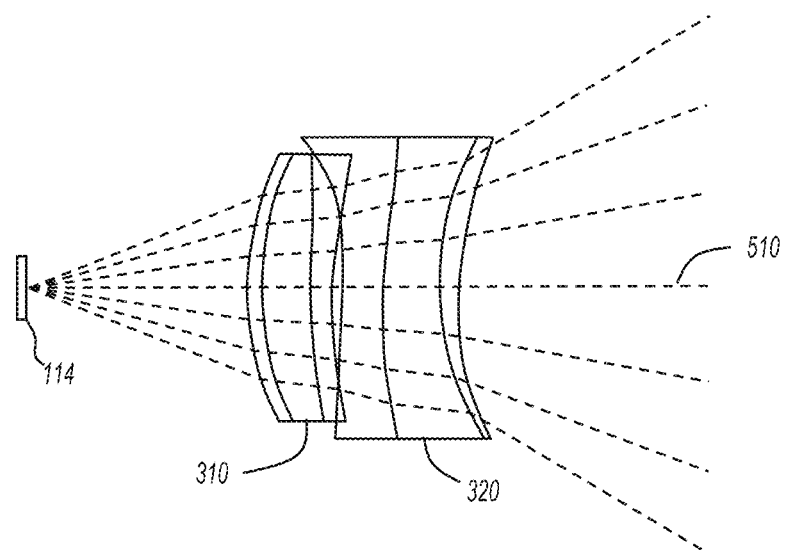
FIG. 7 shows angular velocity correction in accordance with various embodiments of the present invention.

FIG. 7 shows angular velocity correction in accordance with various embodiments of the present invention. Scanning device 114 is a point source or virtual point source that emits the light rays as shown. The light rays are input to lens 310 with a sinusoidal velocity profile as scanning device 114 moves at resonance. Lens 310 refracts light at angles greater or than or equal to zero with respect to optical axis 510 for all input angles from the point source. This is shown in FIG. 7 where each of the light rays between lens 310 and 320 has a positive angle with respect to the optical axis 510, and then each of the output light rays that exits lens 320 has a greater positive angle with respect to optical axis 310. Accordingly, angular velocity correcting optical device 142 not only corrects the angular velocity of the light rays, but also expands the field of view.

Figure 8:
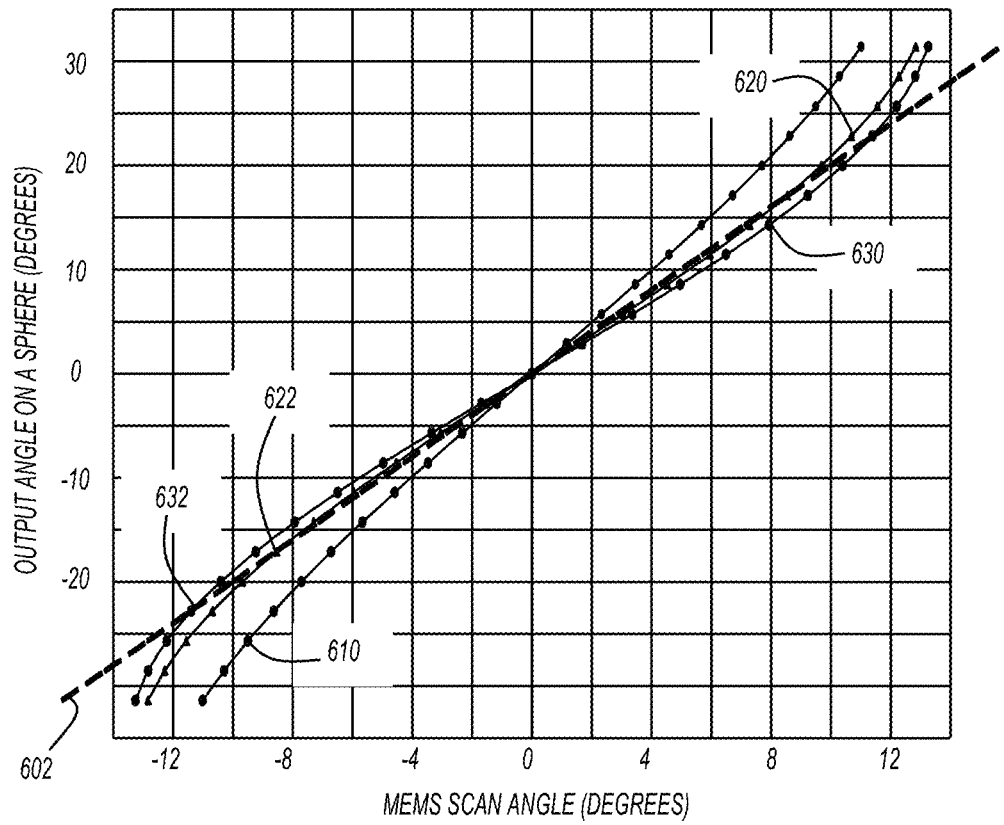
FIG. 8 shows velocity correction for various angular velocity correcting optics designs in accordance with various embodiments of the present invention.

The output beams emerging from the optics have equal spacing. This spacing can be designed to be equally spaced on a circle (equiangular) or on a flat surface (constant pitch). When the laser beam is modulated in equal time increments, the laser spots which appear on the target surface will appear to move at a constant velocity. When used in a range sensing application such as LIDAR, a constant velocity, equal time modulation approach casts a uniform grid on the target in a fixed amount of time and does not lead to spatial sampling errors. This iso-kinetic sampling approach provides for a faithful reproduction of the target surface characteristics FIG. 8 shows velocity correction for various angular velocity correcting optics designs in accordance with various embodiments of the present invention. The curves in FIG. 8 represent constant velocity optical device designs for different maximum mirror scan angles that each produce output having a 62.8° field of view on the resonant axis. Device 610 produces a 62.8° field of view for a max mirror angle of 11.01°, device 620 produces a 62.8° field of view for a max mirror angle of 12.84°, and device 630 produces a 62.8° field of view for a max mirror angle of 13.26°.

Line 602 corresponds to a theoretical design limit at which the scanning mirror's scan angle never exceeds the angle of the light output from the angular velocity correcting optical device. Both of devices 620 and 630 cross line 602 for smaller scanning mirror angles. The point at which line 602 is crossed is referred to herein as the "crossover point." The area between the zero angle point and the crossover point is referred to herein as "crossover." Device 620 has a crossover point 622 at a scanning mirror angle of 8.5°, and device 630 has a crossover point 632 at a scanning mirror angle of 11.4°.

Crossover in the angular velocity correcting optical device is required if at any time the reflected ray angle from the scanning mirror output exceeds the product's output scan angle—at that same point in time—as dictated by the application. This happens at small angles if the scanning mirror is rotating too quickly. In which case the refraction (or reflection) at the first optical surface of the angular velocity correcting optical device has to bend the light rays towards the optical axis. The second refractive (or reflective) surface is then designed to subsequently bend the rays at the required output angle. It takes at least two optical surfaces—with optical power—to make a constant velocity optical device for a scanning mirror that is moving fast enough to enable the projection of a high definition (HD) image or acquire a high frame rate and high-resolution depth image of the field of view. More optical surfaces may provide better results in the form of small spot size, small velocity errors, low distortion, etc.

During the scan, as the scanning mirror starts to slow down towards zero velocity, there is a point at which crossover is no longer required. At this point in the scan, the angular velocity correcting optical device's output ray angles exceed the ray angle produced by the scanning mirror. In this case the scan field beam's angular velocity exceeds the scanning mirror's reflected rays' angular velocity.

Figure 9:
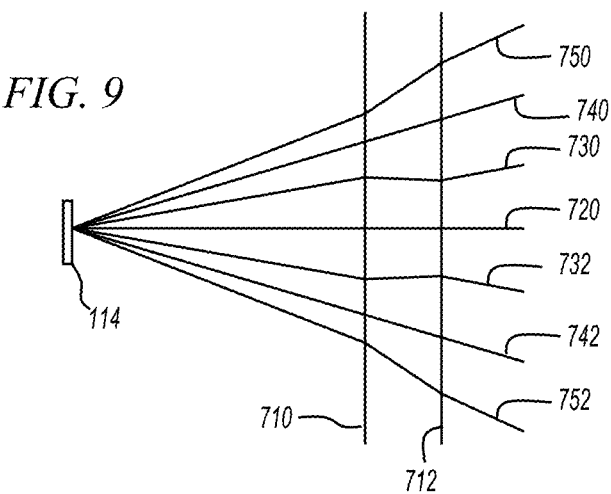
FIG. 9 shows a schematic view of an angular velocity correction optics design in accordance with various embodiments of the present invention.

FIG. 9 shows a schematic view of an angular velocity correction optics design in accordance with various embodiments of the present invention. Line 710 represents at least one first optical surface, and line 712 represents at least one second optical surface. For example, lines 710 and 720 may be single optical surfaces (each of lines 710 and 712 are opposing surfaces of a single lens). Also for example, lines 710 and 712 may each be multiple optical surfaces. This is the case where line 710 represents lens 310, and line 712 represents 320.

The angular velocity correction optical device shown in FIG. 9 exhibits crossover at angles represented by rays 740 and 742. At these angles, the scanning mirror's angle is equal to the output angle. For smaller angles (e.g., rays 730 and 732, optical surface(s) represented by line 710 refract (or reflect) the light rays towards the optical axis 720, and optical surface(s) represented by line 712 refract (or reflect) the light rays back out at the desired output angle. A single optical surface cannot provide a constant angular velocity correcting lens for designs that include crossover. For example, a single reflective surface that is concave in the center will produce output light rays that cross the optical axis. The light must be refracted (or reflected) at least twice to provide the desired output ray angle.

Figure 10:
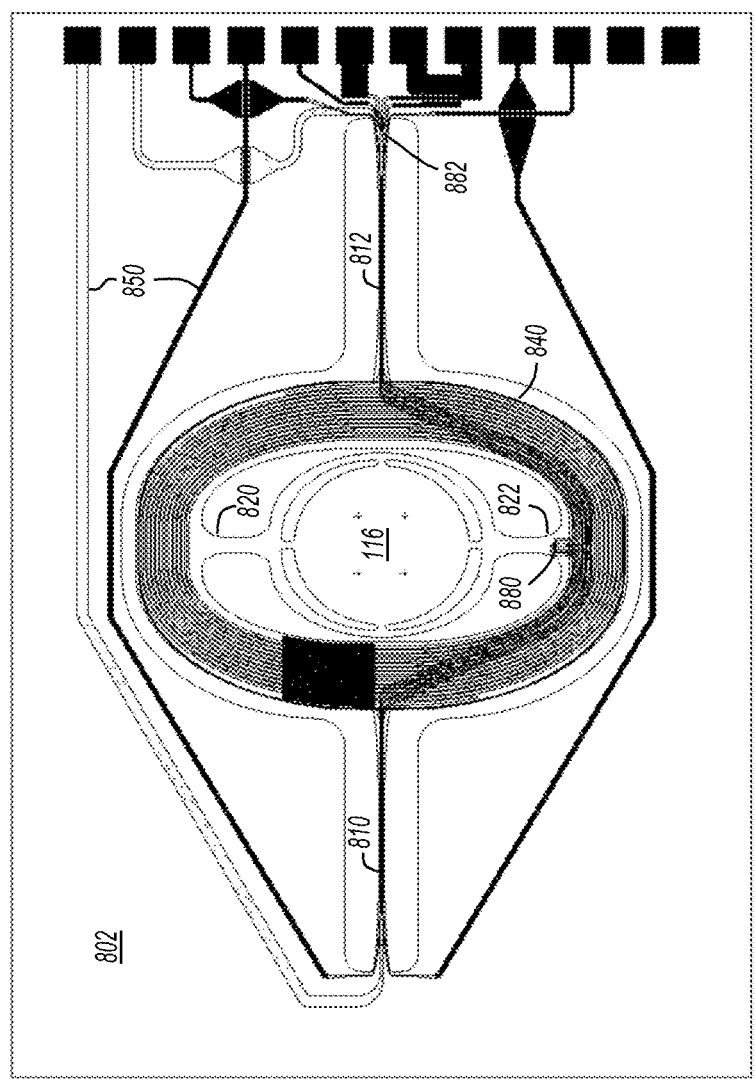
FIG. 10 shows a plan view of a scanning device in accordance with various embodiments of the present invention.

FIG. 10 shows a plan view of a scanning device in accordance with various embodiments of the present invention. Scanning device 114 is a microelectromechanical system (MEMS) device with a scanning mirror. Scanning device 114 includes fixed platform 802, scanning platform 840, and scanning mirror 116. Scanning platform 840 is coupled to fixed platform 802 by flexures 810 and 812, and scanning mirror 116 is coupled to scanning platform 840 by flexures 820 and 822. Scanning platform 840 has a drive coil connected to drive lines 850, which are driven by a drive signal provided on node 173 from summer 185 (FIG. 1). The drive signal includes an excitation signal to excite resonant motion of scanning mirror 116 on the fast-scan axis, and also includes a slow-scan drive signal to cause non-resonant motion of scanning platform 840 on the slow-scan axis. Current driven into drive lines 850 produces a current in the drive coil.

In operation, an external magnetic field source (not shown) imposes a magnetic field on the drive coil. The magnetic field imposed on the drive coil by the external magnetic field source has a component in the plane of the coil, and is oriented non-orthogonally with respect to the two drive axes. The in-plane current in the coil windings interacts with the in-plane magnetic field to produce out-of-plane Lorentz forces on the conductors. Since the drive current forms a loop on scanning platform 840, the current reverses sign across the scan axes. This means the Lorentz forces also reverse sign across the scan axes, resulting in a torque in the plane of and normal to the magnetic field. This combined torque produces responses in the two scan directions depending on the frequency content of the torque.

The long axis of flexures 810 and 812 form a pivot axis. Flexures 810 and 812 are flexible members that undergo a torsional flexure, thereby allowing scanning platform 840 to rotate on the pivot axis and have an angular displacement relative to fixed platform 802. Flexures 810 and 812 are not limited to torsional embodiments as shown in FIG. 10. For example, in some embodiments, flexures 810 and 812 take on other shapes such as arcs, "S" shapes, or other serpentine shapes. The term "flexure" as used herein refers to any flexible member coupling a scanning platform to another platform (scanning or fixed), and capable of movement that allows the scanning platform to have an angular displacement with respect to the other platform.

Scanning mirror 116 pivots on a first axis formed by flexures 820 and 822, and pivots on a second axis formed by flexures 810 and 812. The first axis is referred to herein as the horizontal axis or fast-scan axis, and the second axis is referred to herein as the vertical axis or slow-scan axis. The distinction between vertical and horizontal is somewhat arbitrary, since a rotation of the scanning mirror will cause a rotation of the two axes. Accordingly, the various embodiments of the present invention are not to be limited by the terms "horizontal" and "vertical."

In some embodiments, scanning mirror 116 scans at a mechanically resonant frequency on the fast-scan axis resulting in a sinusoidal horizontal sweep. Further, in some embodiments, scanning mirror 116 scans at a non-resonant frequency on the slow-scan axis, so the vertical scan frequency and angular extents can be controlled independently.

Scanning device 114 also incorporates one or more integrated piezoresistive position sensors. Piezoresistive sensor 880 produces a voltage that represents the displacement of mirror 116 with respect to scanning platform 840, and this voltage is provided as the feedback FSYNC signal on node 175 (FIG. 1). Piezoresistive sensor 882 produces a voltage that represents the displacement of scanning platform 840 with respect to fixed platform 802, and this voltage is provided as the slow-scan position feedback signal on node 177 (FIG. 1). As shown in FIG. 10, in some embodiments, position sensors are provided on both scan axes, although this is not a limitation of the present invention. For example, in some embodiments, scanning device 114 includes a position sensor on only one axis. In some embodiments, one or more analog-to-digital converters are included to digitize the voltages produced by the piezoresistive position sensors. In these embodiments, one or both of the FSYNC signal and slow-scan position feedback signal are provided as streams of digital data.

The particular MEMS device embodiment shown in FIG. 10 is provided as an example, and the various embodiments of the invention are not limited to this specific implementation. For example, any combination of scanning mirrors capable of sweeping in two dimensions to reflect a light beam in a raster pattern may be incorporated without departing from the scope of the present invention. Also for example, any combination of scanning mirrors (e.g., two mirrors: one for each axis) may be utilized to reflect a light beam in a raster pattern. Further, any type of mirror drive mechanism may be utilized without departing from the scope of the present invention. For example, although scanning device 114 uses a drive coil on a moving platform with a static magnetic field, other embodiments may include a magnet on a moving platform with drive coil on a fixed platform. Further, the mirror drive mechanism may include an electrostatic and/or a piezoelectric drive mechanism.

Figure 11:
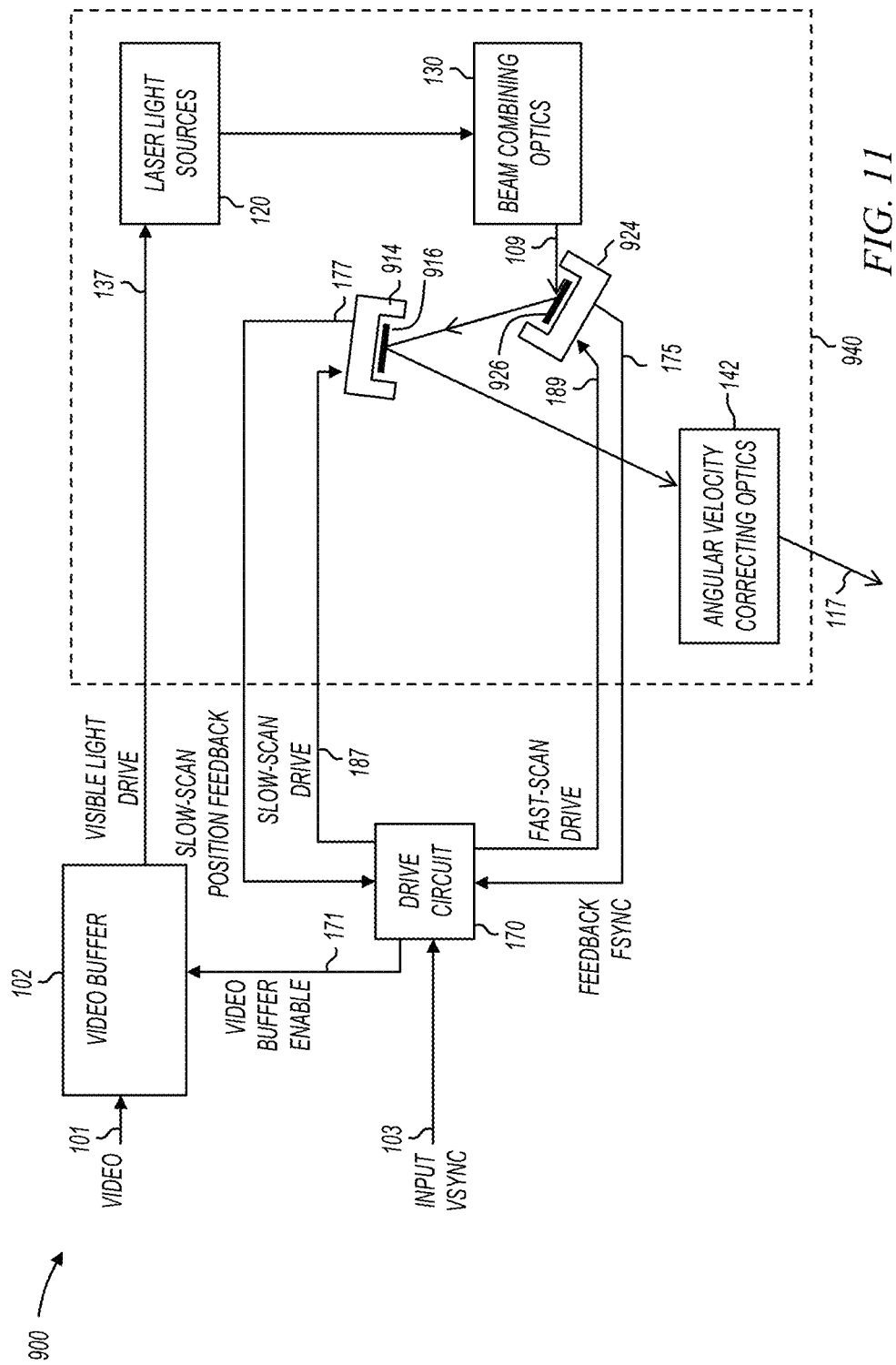
FIG. 11 shows a scanning laser projection system in accordance with various embodiments of the present invention.

FIG. 11 shows a scanning laser projection system in accordance with various embodiments of the present invention. Laser projection system 900 is similar to laser projection system 100 (FIG. 1) with the exception that the scanning engine 940 includes two scanning mirrors instead of one. In some embodiments, a first MEMS device 924 includes a scanning mirror 926 configured to deflect along one axis and a second MEMS device 914 includes a scanning mirror 916 configured to deflect along a second axis that is largely perpendicular to the first axis. Furthermore, in some embodiments, the first mirror is used for fast-scan motion, while the second mirror is used for slow-scan motion. In some embodiments, the fast-scan motion comprises resonant sinusoidal motion while the slow-scan motion comprises non-resonant quasi-static controlled motion.

Drive circuit 170 provides a fast-scan drive signal to MEMS device 924 on node 189 to excite motion of mirror 926, and receives a feedback sync signal FSYNC on node 175. Drive circuit 170 also provides a slow-scan drive signal to MEMS device 914 on node 187 to excite motion of mirror 916 and receives a slow-scan position feedback signal on node 177.

Scanning projection system may also include one or more IR light sources, an IR photodetector, time-of-flight measurement circuitry, and depth map data storage. These are described above with reference to FIG. 1.

Figure 12:
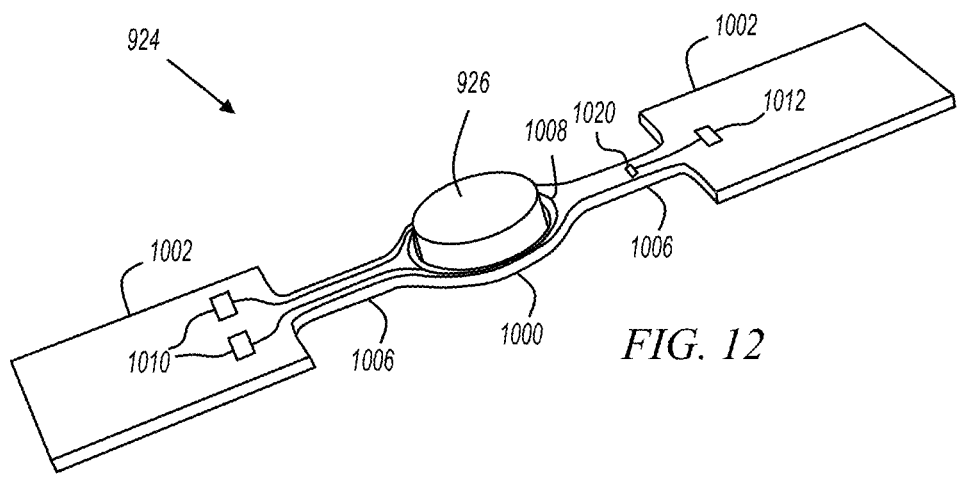
FIG. 12 shows a perspective view of a MEMS device with a scanning mirror in accordance with various embodiments of the present invention.

FIG. 12 shows a perspective view of a MEMS device with a scanning mirror in accordance with various embodiments of the present invention. MEMS device 924 includes fixed platforms 1002, scanning platform 1000, and scanning mirror 926. Scanning platform 1000 is coupled to fixed platforms 1002 by flexures 1006. Scanning platform 1000 has a drive coil 1008 connected to contacts 1010, which are driven by a fast-scan drive signal provided on node 189 from drive control circuit 170 (FIG. 11).

The axis of flexures 1006 forms a pivot axis. Flexures 1006 are flexible members that undergo a torsional flexure, thereby allowing scanning platform 1000 to rotate on the pivot axis and have an angular displacement relative to fixed platforms 1002. Flexures 1006 are not limited to torsional embodiments as shown in FIG. 12. For example, in some embodiments, flexures 1006 take on other shapes such as arcs, "S" shapes, or other serpentine shapes.

In operation, an external magnetic field source (not shown) imposes a magnetic field on the drive coil. The magnetic field imposed on the drive coil by the external magnetic field source has a component in the plane of the coil. The in-plane current in the coil windings interacts with the in-plane magnetic field to produce out-of-plane Lorentz forces on the conductors. Since the drive current forms a loop on scanning platform 1000, the current reverses sign across the scan axis. This means the Lorentz forces also reverse sign across the scan axis, resulting in a torque in the plane of and normal to the magnetic field. This combined torque produces a response on the scan axis depending on the frequency content of the torque. In some embodiments, scanning platform 1000 and mirror 926 scan at a mechanically resonant frequency on the fast-scan axis resulting in a sinusoidal sweep.

MEMS device 924 also incorporates one or more integrated piezoresistive position sensors. Piezoresistive sensor 1020 produces a voltage that represents the displacement of scanning platform 1000 and mirror 926 with respect to fixed platforms 1002. Piezoresistive sensor 1020 is coupled to contact 1012. The voltage on contact 1012 is provided as the feedback FSYNC signal on node 175 (FIG. 11). In some embodiments, the FSYNC signal is provided as an analog signal. In other embodiments, the FSYNC signal is digitized using a comparator (not shown) or an analog-to-digital converter (not shown) such that a digital feedback signal is provided on node 175 (FIG. 11).

Much of MEMS device 924 can be fabricated from a single common substrate using MEMS techniques. For example, the fixed platforms 1002, the scanning platform 1000 and the two flexures 1006 can all be formed from the same substrate. Additionally, in some embodiments, the drive coil 1008 and contacts 1010 and 1012 can also be formed with any suitable MEMS technique. For example, the drive coil 1008 and contacts 1010 and 1012 can be formed by the selective deposition and patterning of conductive materials on the substrate.

Figures 13A, 13B:
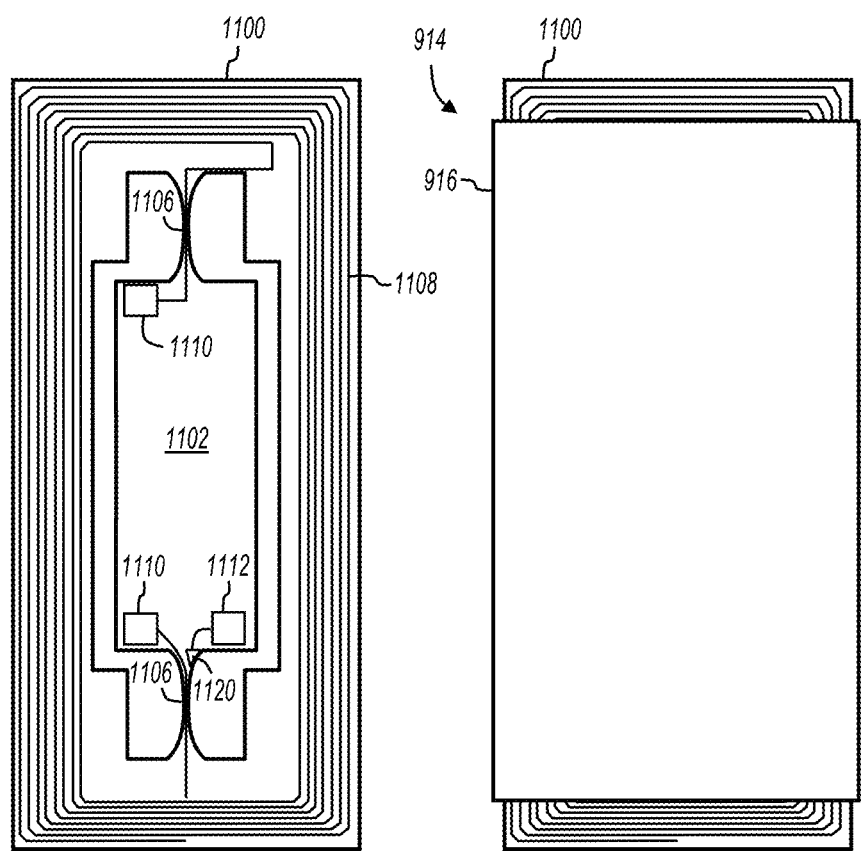
FIGS. 13A and 13B show plan views of a MEMS device with a scanning mirror in accordance with various embodiments of the present invention.

FIGS. 13A and 13B show plan views of a MEMS device with a scanning mirror in accordance with various embodiments of the present invention. MEMS device 914 includes a stationary mount portion 1102, a movable portion 1100, two flexures 1106, coil traces 1108, and contacts 1110. In operation, the movable portion 1100 facilitates the motion of the attached mirror 916 to facilitate scanning in a laser scanning device.

The stationary mount portion 1102 is located in a central portion of the MEMS device 914. The stationary mount portion 1102 is configured to be mounted to a die carrier in a scanner assembly (not shown in FIG. 13) or other suitable device.

The movable portion 1100 substantially surrounds the stationary mount portion 1102 and is coupled to the mirror 1116 through attachment structures (not shown). In some embodiments, the attachment structures serve to offset the mirror 916 away from the movable portion 1100. This offset of the mirror 916 away from the movable portion 1100 allows the mirror 916 to rotate without impacting the stationary mount portion 1102.

The movable portion 1100 includes coil traces 1108 while the stationary mount portion 1102 includes various contacts 1110 and 1112. The coil traces 1108 are configured to interact with applied magnetic fields and generate non-resonant or quasi-static motion. In some embodiments, coil traces 1108 circumscribe the stationary mount portion 1102 so that the stationary mount portion 1102 is located substantially in the center of the coil traces 1108; however, this is not a limitation of the present invention. In some embodiments, separate and independent coil traces on either side of the stationary mount portion 1102 are used. In further embodiments, coil traces are formed on the attachment structures (not shown).

Contacts 1110 and 1112 provide electrical connections between the movable portion 1100 and stationary portion 1102. Contacts 1110 provide electrical connections to coil traces 1108, and contact 1112 provides an electrical connection to position sensor 1120.

The two flexures 1106 are located on opposing sides of the stationary mount portion 1102 and extend outwardly from the stationary mount portion 1102 to the movable portion 1100 to form a pivot axis. So configured, the two flexures 1106 flexibly couple the stationary mount portion 1102 to the movable portion 1100 to facilitate movement of the movable portion 1100 with respect to the stationary mount portion 1102 along the pivot axis. Specifically, the two flexures 1106 allow the movable portion 1100 and the mirror 916 to rotate about the pivot axis. This rotation of the mirror 916 facilitates the use of the mirror 916 to reflect a laser beam through angular extents in a scan pattern.

During operation, drive circuit 170 (FIG. 11) provides a slow-scan drive signal to the coil trace 1108 through contacts 1110. The applied slow-scan drive signal creates electromagnetic interactions between the coil trace 1108 and an applied magnetic field, and those interactions excite motion of the movable portion 1100 and the attached mirror 916. The resulting motion of mirror 916 can be configured to reflect laser light into a pattern of scan lines, and thus can facilitate scanning laser projection and/or laser depth sensing.

MEMS device 914 also incorporates one or more integrated piezoresistive position sensors 1120. Piezoresistive sensor 1120 produces a voltage that represents the displacement of mirror 916 with respect to stationary portion 1102, and this voltage is provided as the slow-scan position feedback signal on node 177 (FIG. 11). In some embodiments, the slow-scan position feedback signal is provided as an analog signal. In other embodiments, the slow-scan position feedback signal is digitized using an analog-to-digital converter (not shown) such that a digital feedback signal is provided on node 177 (FIG. 11).

Much of MEMS device 914 can be fabricated from a single common substrate using MEMS techniques. Thus, the stationary mount portion 1102, the movable portion 1100 and the two flexures 1106 can all be formed from the same substrate. Additionally, in some embodiments attachment structures can also be formed from the same substrate, while in other embodiments the attachment structures are formed separately or as part of the mirror 916. The coil traces 1108 and contacts 1110 and 1112 can also be formed with any suitable MEMS technique. For example, the coil traces 1108 and contacts 1110 and 1112 can be formed by the selective deposition and patterning of conductive materials on the substrate.

Figure 14:
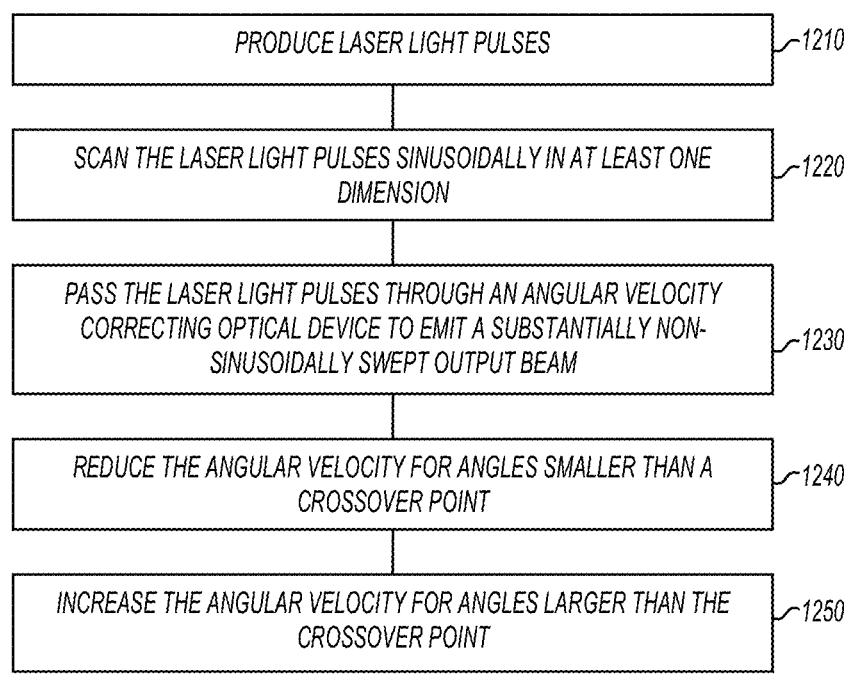
FIG. 14 shows a flow diagram of methods in accordance with various embodiments of the present invention.

FIG. 14 shows a flow diagram of methods in accordance with various embodiments of the present invention. In some embodiments, method 1200, or portions thereof, is performed by a scanning laser projection system. In other embodiments, method 1200 is performed by a series of lenses or an optical system. Method 1200 is not limited by the particular type of apparatus performing the method. The various actions in method 1200 may be performed in the order presented, or may be performed in a different order. Further, in some embodiments, some actions listed in FIG. 14 are omitted from method 1200.

Method 1200 is shown beginning with block 1210. As shown at 1210, laser light pulses are produced. The laser light pulses may be visible or nonvisible. For example, the laser light pulses may be red, green, and/or blue laser light pulses used to project an image, or may be infrared laser light pulses used to measure distances to objects in a LIDAR application. In some embodiments, both visible and nonvisible laser light pulses are produced.

At 1220, the laser light pulses are scanned sinusoidally in at least one dimension. In some embodiments, the laser light pulses are scanned using a single biaxial scanning mirror (114, FIG. 1), and in other embodiments, the laser light pulses are scanned using two scanning mirrors, at least one of which is resonant (924, FIG. 12).

At 1230, the scanned laser light pulses are passed through an angular velocity correcting optical device to emit a substantially non-sinusoidally swept output beam. The angular velocity correcting optical device may be any embodiment described herein. For example, the angular velocity correcting optical device may include one or more lenses and may exhibit crossover. 1240 and 1250 describe actions taken when the angular velocity correcting optical device exhibits crossover. At 1240, the angular velocity is reduced for angles smaller than a crossover point, and at 1250, the angular velocity is increased for angles larger than the crossover point.

Figure 15:
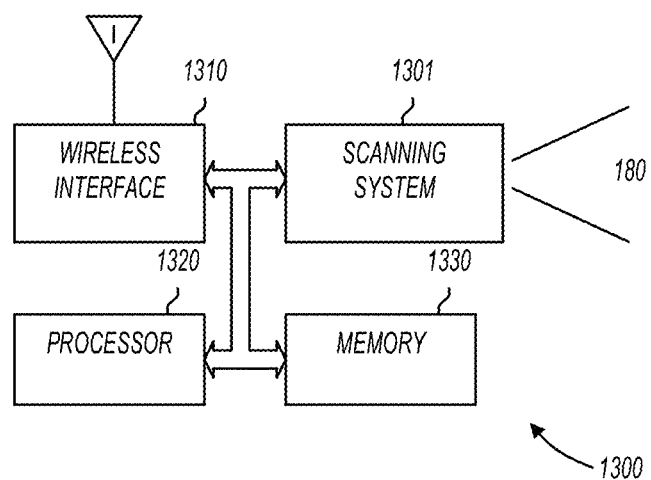
FIG. 15 shows a block diagram of a mobile device in accordance with various embodiments of the present invention.

FIG. 15 shows a block diagram of a mobile device in accordance with various embodiments of the present invention. As shown in FIG. 15, mobile device 1300 includes wireless interface 1310, processor 1320, memory 1330, and scanning system 1301. Scanning system 1301 includes any of the angular velocity correcting optics as described above.

Scanning system 1301 may receive image data from any image source. For example, in some embodiments, scanning system 1301 includes memory that holds still images. In other embodiments, scanning system 1301 includes memory that includes video images. In still further embodiments, scanning system 1301 displays imagery received from external sources such as connectors, wireless interface 1310, a wired interface, or the like.

Wireless interface 1310 may include any wireless transmission and/or reception capabilities. For example, in some embodiments, wireless interface 1310 includes a network interface card (NIC) capable of communicating over a wireless network. Also for example, in some embodiments, wireless interface 1310 may include cellular telephone capabilities. In still further embodiments, wireless interface 1310 may include a global positioning system (GPS) receiver. One skilled in the art will understand that wireless interface 1310 may include any type of wireless communications capability without departing from the scope of the present invention.

Processor 1320 may be any type of processor capable of communicating with the various components in mobile device 1300. For example, processor 1320 may be an embedded processor available from application specific integrated circuit (ASIC) vendors, or may be a commercially available microprocessor. In some embodiments, processor 1320 provides image or video data to scanning system 1301. The image or video data may be retrieved from wireless interface 1310 or may be derived from data retrieved from wireless interface 1310. For example, through processor 1320, scanning system 1301 may display images or video received directly from wireless interface 1310. Also for example, processor 1320 may provide overlays to add to images and/or video received from wireless interface 1310, or may alter stored imagery based on data received from wireless interface 1310 (e.g., modifying a map display in GPS embodiments in which wireless interface 1310 provides location coordinates).

Figure 16:
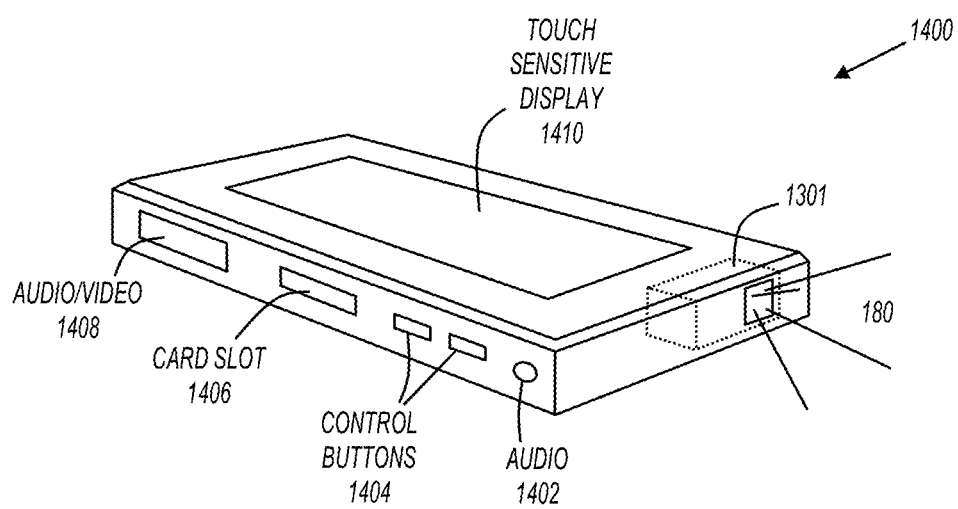
FIG. 16 shows a mobile device in accordance with various embodiments of the present invention.

FIG. 16 shows a mobile device in accordance with various embodiments of the present invention. Mobile device 1400 may be a hand held scanning laser projection system with or without communications ability. For example, in some embodiments, mobile device 1400 may be a scanning laser projection system with little or no other capabilities. Also for example, in some embodiments, mobile device 1400 may be a device usable for communications, including for example, a cellular phone, a smart phone, a tablet computing device, a global positioning system (GPS) receiver, or the like. Further, mobile device 1400 may be connected to a larger network via a wireless (e.g., cellular), or this device can accept and/or transmit data messages or video content via an unregulated spectrum (e.g., WiFi) connection.

Mobile device 1400 includes scanning system 1301, touch sensitive display 1410, audio port 1402, control buttons 1404, card slot 1406, and audio/video (A/V) port 1408. None of these elements are essential. For example, mobile device 1400 may only include scanning system 1301 without any of touch sensitive display 1410, audio port 1402, control buttons 1404, card slot 1406, or A/V port 1408. Some embodiments include a subset of these elements. For example, an accessory projector may include scanning system 1301, control buttons 1404 and A/V port 1408. A smartphone embodiment may combine touch sensitive display device 1410 and scanning system 1301.

Touch sensitive display 1410 may be any type of display. For example, in some embodiments, touch sensitive display 1410 includes a liquid crystal display (LCD) screen. In some embodiments, display 1410 is not touch sensitive. Display 1410 may or may not always display the image projected by scanning system 1301. For example, an accessory product may always display the projected image on display 1410, whereas a mobile phone embodiment may project a video while displaying different content on display 1410. Some embodiments may include a keypad in addition to touch sensitive display 1410.

A/V port 1408 accepts and/or transmits video and/or audio signals. For example, A/V port 1408 may be a digital port, such as a high definition multimedia interface (HDMI) interface that accepts a cable suitable to carry digital audio and video data. Further, A/V port 1408 may include RCA jacks to accept or transmit composite inputs. Still further, A/V port 1408 may include a VGA connector to accept or transmit analog video signals. In some embodiments, mobile device 1400 may be tethered to an external signal source through A/V port 1408, and mobile device 1400 may project content accepted through A/V port 1408. In other embodiments, mobile device 1400 may be an originator of content, and A/V port 1408 is used to transmit content to a different device.

Audio port 1402 provides audio signals. For example, in some embodiments, mobile device 1400 is a media recorder that can record and play audio and video. In these embodiments, the video may be projected by scanning system 1301 and the audio may be output at audio port 1402.

Mobile device 1400 also includes card slot 1406. In some embodiments, a memory card inserted in card slot 1406 may provide a source for audio to be output at audio port 1402 and/or video data to be projected by scanning laser projector 1301. Card slot 1406 may receive any type of solid state memory device, including for example secure digital (SD) memory cards.

Figure 17:
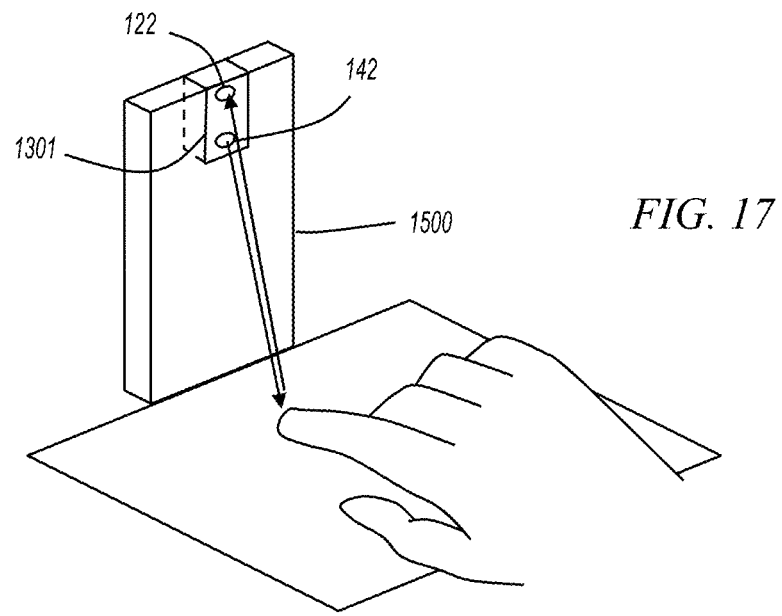
FIG. 17 shows a mobile laser detection and ranging (LIDAR) device in accordance with various embodiments of the present invention.

FIG. 17 shows a mobile laser detection and ranging (LIDAR) device in accordance with various embodiments of the present invention. Mobile LIDAR device 1500 includes scanning system 1301, which in turn includes angular velocity correcting optical device 142 and photodetector 122. In operation, LIDAR device 1500 may emit IR laser pulses in the field of view and detect the time-of-flight of reflected pulses to determine the distance to objects in the field of view. LIDAR device 1500 may also project an image in the field of view.

Figure 18:
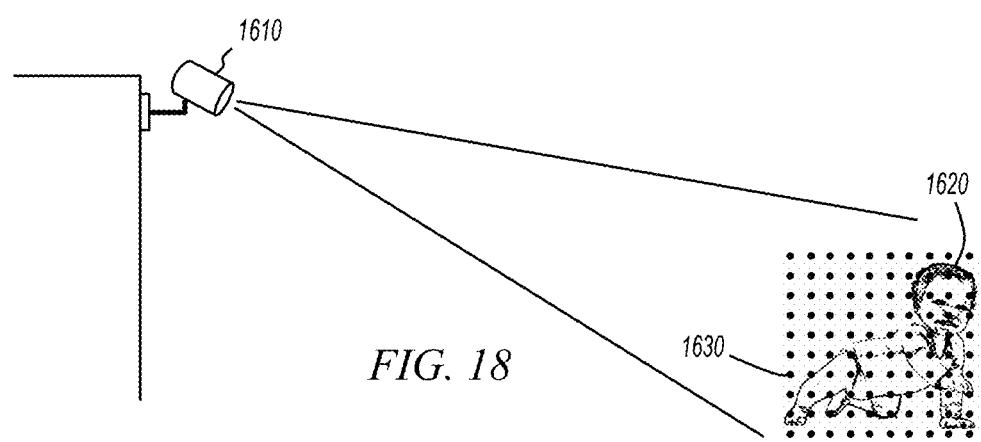
FIG. 18 shows a security camera in accordance with various embodiments of the present invention.

FIG. 18 shows a security camera in accordance with various embodiments of the present invention. In some embodiments, security camera 1610 performs ranging functions using a sinusoidal scanner and TOF detection circuitry as described above. In some embodiments, security camera 1610 may detect and classify objects detected in a field of view using an array of TOF detection points 1630. For example, in a residential security application, security camera 1610 may detect an object 1620 and then classify the object as either human or nonhuman. Security camera 1610 includes an angular velocity correcting optical device such as device 142 (FIG. 1).

FIG. 19 shows eyewear in accordance with various embodiments of the invention. Scanning system 1301 is shown as a projector mounted in eyewear 1700 to project a display in the eyewear's field of view. In some embodiments, eyewear 1700 is see-through and in other embodiments, eyewear 1700 is opaque. For example, eyewear 1700 may be used in an augmented reality application in which a wearer can see the display from scanning system 1301 overlaid on the physical world. Also for example, eyewear 1700 may be used in a virtual reality application, in which a wearer's entire view is generated by scanning system 1301. Although only one scanning system 1301 is shown in FIG. 19, this is not a limitation of the present invention. For example, in some embodiments, eyewear 1700 includes two scanning systems; one for each eye.

FIG. 20 shows an automobile in accordance with various embodiments of the present invention. As shown in FIG. 20, vehicle 1800 includes scanning system 1301 located on the vehicle such that imaging can be performed both in front of the automobile and to the rear of the automobile. In some embodiments, multiple scanning systems 1301 are included, each having an angular offset to create an effective 360 degree imaging system.

FIG. 21 shows a drone in accordance with various embodiments of the present invention. Drone 1700 includes scanning system 1301. Drone 1700 may detect an object in the sky or on the ground using the methods and apparatus described herein.

Although the present invention has been described in conjunction with certain embodiments, it is to be understood that modifications and variations may be resorted to without departing from the scope of the invention as those skilled in the art readily understand. Such modifications and variations are considered to be within the scope of the invention and the appended claims.

What is claimed is:

1. An optical device comprising:
at least one first optical surface to refract light from a light source, wherein the at least one first optical surface refracts light towards an optical axis for input angles from the light source less than a cross over threshold, and refracts light away from the optical axis for input angles from the light source greater than the cross over threshold; and
at least one second optical surface to refract light received from the at least one first optical surface, wherein the at least one first optical surface and the at least one second optical surface are shaped so that a light ray emerging from the at least one second optical surface sweeps substantially non-sinusoidally when a light ray from the light source sweeps sinusoidally.

2. The optical device of claim 1 wherein the at least one first optical surface and the at least one second optical surface are shaped so that a light ray emerging from the at least one second optical surface sweeps with a constant angular velocity when a light ray from the light source sweeps sinusoidally.

3. The optical device of claim 1 wherein the at least one first optical surface and the at least one second optical surface are shaped so that a light ray emerging from the at least one second optical surface sweeps with a constant pitch on a flat target surface when a light ray from the light source sweeps sinusoidally.

4. The optical device of claim 1 wherein the at least one first optical surface comprises two surfaces and the at least one second optical surface comprises two surfaces.

5. The optical device of claim 1 wherein the at least one first optical surface comprises a first lens and the at least one second optical surface comprises a second lens.

6. The optical device of claim 1 wherein the at least one first optical surface and the at least one second optical surface are shaped according to Zernike polynomials.

7. The optical device of claim 1 wherein the at least one first optical surface and the at least one second optical surface are further shaped to correct for projection distortion.

8. An apparatus comprising:
at least one laser light source;
a scanning mirror that scans light from the at least one laser light source sinusoidally in at least one dimension; and
an optical system that includes at least two curved optical surfaces, wherein the at least two curved optical surfaces are shaped to emit a substantially non-sinusoidally swept light ray when receiving a sinusoidally swept light ray from the scanning mirror, wherein the optical system emits an output light ray having a lower angular velocity than an input light ray for input angles with respect to an optical axis less than a cross over point, and a higher angular velocity than the input light ray for input angles with respect to the optical axis greater than or equal to the cross over point.

9. The apparatus of claim 8 wherein the at least two curved optical surfaces are curved so that a light ray emerging from the optical system sweeps with a constant angular velocity when receiving the sinusoidally swept light ray from the scanning mirror.

10. The apparatus of claim 8 wherein the at least two curved optical surfaces are curved so that a light ray emerging from the optical system sweeps with a constant pitch on a flat target surface when receiving the sinusoidally swept light ray from the scanning mirror.

11. The apparatus of claim 8 wherein the at least two curved optical surfaces comprise refractive surfaces.

12. The apparatus of claim 8 wherein the at least two curved optical surfaces comprise two lenses.

13. The apparatus of claim 12 wherein the two lenses have freeform surface shapes described by Zernike polynomials.

14. The apparatus of claim 8 wherein the at least two curved surfaces are further shaped to correct for projection distortion.

15. A method comprising:
producing laser light pulses;
scanning the laser light pulses sinusoidally in at least one dimension; and
passing sinusoidally scanned laser light pulses through at least two curved optical surfaces that emit laser light pulses at a constant angular velocity;
wherein passing sinusoidally scanned laser light pulses through at least two curved optical surfaces that emit laser light pulses at a constant angular velocity comprises reducing an angular velocity for input angles with respect to an optical axis less than a cross over point, and increasing the angular velocity for input angles with respect to the optical axis greater than or equal to the cross over point.

* * * * *